United States Patent [19]

Bergland et al.

[11] Patent Number: 5,524,154
[45] Date of Patent: Jun. 4, 1996

[54] HYBRID ARCHITECTURE FOR AN OPTICAL SWITCHING FABRIC IMPLEMENTED WITH 1×2 SWITCHING DEVICES

[75] Inventors: Glenn D. Bergland, Berkeley Heights, N.J.; Edmond J. Murphy, Bethlehem, Pa.; Walter M. Pitio, Old Bridge, N.J.

[73] Assignee: AT&T Corp., Murray Hill, N.J.

[21] Appl. No.: 298,911

[22] Filed: Aug. 31, 1994

[51] Int. Cl.⁶ .............................. G02B 6/26; G02B 6/42
[52] U.S. Cl. ................................ 385/17; 359/117
[58] Field of Search .................. 385/16, 17; 370/16, 370/60, 53; 340/825.07, 825.79; 455/600, 612, 617

[56] References Cited

U.S. PATENT DOCUMENTS

| | | | |
|---|---|---|---|
| 4,778,235 | 10/1988 | Fujiwara | 350/96.13 |
| 4,787,692 | 11/1988 | Spanke | 385/17 |
| 4,787,693 | 11/1988 | Kogelnik et al. | 385/17 |
| 4,822,124 | 4/1989 | Suzuki | 385/17 |
| 4,932,735 | 6/1990 | Koai | 385/17 |
| 5,010,542 | 4/1991 | Pfaff | 385/17 |
| 5,018,129 | 5/1991 | Netravali et al. | 370/1 |
| 5,033,811 | 7/1991 | Yanagawa et al. | 350/96.13 |
| 5,123,069 | 6/1992 | Okayama et al. | 385/16 |
| 5,163,106 | 11/1992 | Okayama et al. | 385/45 |
| 5,166,991 | 11/1992 | Jaeger et al. | 385/16 |
| 5,191,626 | 3/1993 | Stern | 385/24 |
| 5,247,593 | 9/1993 | Lin et al. | 385/17 |

FOREIGN PATENT DOCUMENTS 5341330  12/1993  Japan ..................... 385/17

OTHER PUBLICATIONS

G. David Bergland et al., *A Technology Platform for Providing Broadband Communications Services*, AT&T Technical Journal, vol. 72, No. 6, Nov./Dec. 1993, pp. 48–56.

G. D. Bergland, *Disco for Definity*, Draft Nov. 15, 1993, pp. 1–9 & 1–11.

Chapter 5: Photonic Switching Architectures, (source unknown), pp. 131–138, 141–186. No date available.

*Primary Examiner*—Rodney B. Bovernick
*Assistant Examiner*—Robert E. Wise
*Attorney, Agent, or Firm*—David Volejnicek

[57] ABSTRACT

A hybrid optical switching-fabric architecture, for implementation via Y-branch switching elements, comprises an 8×8 array (100) of eighty Y-branch switching elements (110) configured as a Benes outer layer (105) consisting of two columns (105a, 105b) of four 2×2 networks (103) and an active-splitter/active-combiner inner layer (106) consisting of one column of two 4×4 active-splitter/active-combiner networks (104).

12 Claims, 2 Drawing Sheets

HYBRID ARCHITECTURE FOR AN OPTICAL SWITCHING FABRIC IMPLEMENTED WITH 1×2 SWITCHING DEVICES

TECHNICAL FIELD

This invention relates to optical switching architectures.

BACKGROUND OF THE INVENTION

While commercially still in its infancy, optical switching (i.e., switching in the optical domain) is well known in the switching art. A commonly-used optical switching element is the Y-branch switching element, so called because of its 1×2 topology: it has one optical-signal input port and two optical-signal output ports, or alteratively has two optical-signal input ports and one optical-signal output port. The Y-branch switching element is commonly implemented in a lithium niobate ($LiNbO_3$) substrate, which has the desirable property that when voltage is applied to it, its index of refraction changes. This principle is used for control of the Y-branch switching element: light entering the single input port is channeled to the one of the two output ports that has the higher index of refraction, or alternatively light from the one of the two input ports that has the higher index of refraction is channeled to the single output port.

A problem with lithium niobate-implemented Y-branch switching elements is that chip-fabrication techniques presently use too great a length of substrate—on the order of one centimeter—to implement each Y-branch switching element, and hence consume a lot of valuable space, or "real estate", on the fabrication wafer. This length can be decreased, but there is a tradeoff: the shorter the device is, the higher is the control voltage required to switch it. And higher control voltages are undesirable because they require a greater control voltage swing, resulting in higher power requirements and slower device operation.

To form a switching fabric, switching elements are normally not used individually in isolation, but rather arrays of the elements are interconnected. To be commercially practical, a switching fabric of some basic minimum size, for example, an 8-input-by-8-output switching fabric, has to be integrated into a single package. Hence, multiple switching elements must be interconnected on a single chip via waveguides. In lithium niobate devices, the waveguides are generally implemented by diffusing titanium into the substrate. To achieve practical interconnection of the switching elements, the waveguides are, for the most part, not straight lines, but rather have bends. Here, another set of problems with lithium niobate-implemented switching elements comes into play: the smaller the radius of the bends in the waveguides is, the greater is the loss of optical power in the waveguides. The radius of bends in the waveguides can be reduced, but only at the cost of making the waveguides longer. And longer waveguides result in greater spacing between interconnected switching elements, thereby again consuming valuable "real estate" on the fabrication wafer.

Hence, there are practical limits on the minimum size of Y-branch switching devices and on their spacing in a switching-fabric array. But there are also practical limits on the maximum size of the fabrication wafers on which the switching-fabric arrays of the devices can be implemented. Also, there are economic benefits in integrating as much functionality as possible on available wafer sizes. Therefore, it is highly desirable to limit the number of switching elements, and the number and length of the interconnections between these switching elements, that make up the basic-size switching fabric.

Numerous switching-fabric architectures are known to the art. Included among them are the Benes network, the dilated Benes network, and the active-splitter/active combiner topology. Each network architecture has its own advantages and disadvantages. For example, a Benes network is very efficient in terms of the number of switching elements that are required to implement it. Also, it is a rectangular network that requires a minimum number of switching elements in each column of the network, which tends to minimize the complexity of interconnections between the columns. But a Benes network also requires relatively many columns of switching elements to implement it, which requires a relatively large number of interconnections and consumes relatively large amounts of fabrication-wafer real estate.

A dilated Benes network has many of the same attributes of the Benes network. Its advantage is very low cross-talk between paths through the network. But the advantage is achieved at the cost of more-than-doubling the number of switching elements that are needed to implement it, relative to the simple Benes network. Worse yet, the number of columns of the switching elements is increased relative to the simple Benes network.

In contrast, an active-splitter/active-combiner network is very efficient in terms of the number of columns of switching elements that are required to implement it. However, it requires the height of the columns (the number of switching devices per column) to increase geometrically in the middle stages of the switching-fabric array for every arithmetic increase in the size of the switching fabric, which leads to complex routing and rapidly increases the numbers of required interconnections.

SUMMARY OF THE INVENTION

This invention is directed to solving these and other disadvantages and needs of the prior art. According to the invention, there is provided a hybrid switching-fabric architecture, made up of an outer Benes layer and an inner active-splitter/active-combiner layer, preferably implemented via Y-branch or some other 1×2 switching elements. The Benes layer is a Benes network divided into two halves, with one half connected to signal inputs of the switching fabric and the other half connected to the signal outputs. The active-splitter/active-combiner layer is at least one active-splitter/active-combiner network that interconnects the two halves of the Benes network.

This hybrid architecture takes advantage of the strengths of both constituent architectures while minimizing their weaknesses. The outer Benes layer minimizes the routing complexity and the number of switching elements needed in the middle layer. The inner active-splitter/active.-combiner layer has, in small sizes, about the same routing complexity as a Benes network of comparable size but has less loss because it has fewer stages of switching elements. In this manner, the hybrid architecture balances the tradeoffs involved in the implementation of Y-branch and other b 1×2switching devices and of switching fabrics based thereon. It meets the manufacturing constraints to enable a switching fabric that is implemented as an array of Y-branch switching elements to be made using a minimum number of optical substrates of commercially-practical size.

Such architectures may often be implemented on a single optical substrate. However, for larger architectures or for improved operating parameters (e.g., losses, voltages), it may be desirable to use, multiple directly-coupled substrates. In this case, preferably, a device constructed according to this architecture comprises two symmetrical halves: a first substrate having implemented thereon the one half of the Benes network layer and one of two halves of the active-splitter/active-combiner network layer, and a second substrate having implemented thereon the other half of the Benes network layer and another of the two halves of the active-splitter/active-combiner network layer. The two halves of an active-splitter/active-combiner network need not be equal in size or topology, and generally will not be. The first substrate and the halves of the Benes and the active-splitter/active-combiner network layers implemented thereon are a duplicate of the second substrate and the halves of the Benes and the active-splitter/active-combiner network layer implemented thereon. The two substrates are connected to each other back-to-back whereby they form diagonally-symmetrical mirror images of each other's circuitry and together form the whole device. Specifically, the two halves of the active-splitter/active-combiner network layer on the two substrates are interconnected with each other to form the active-splitter/active-combiner network layer and the device as a whole.

The symmetry of the two halves of the device is important because it allows both sides of the device to be manufactured as two identical switch halves, which are then joined together to form the full device.

These and other advantages and features of the present invention will become more apparent from the following description of an illustrative embodiment of the invention taken together with the drawing.

DETAILED DESCRIPTION

Figure 1:
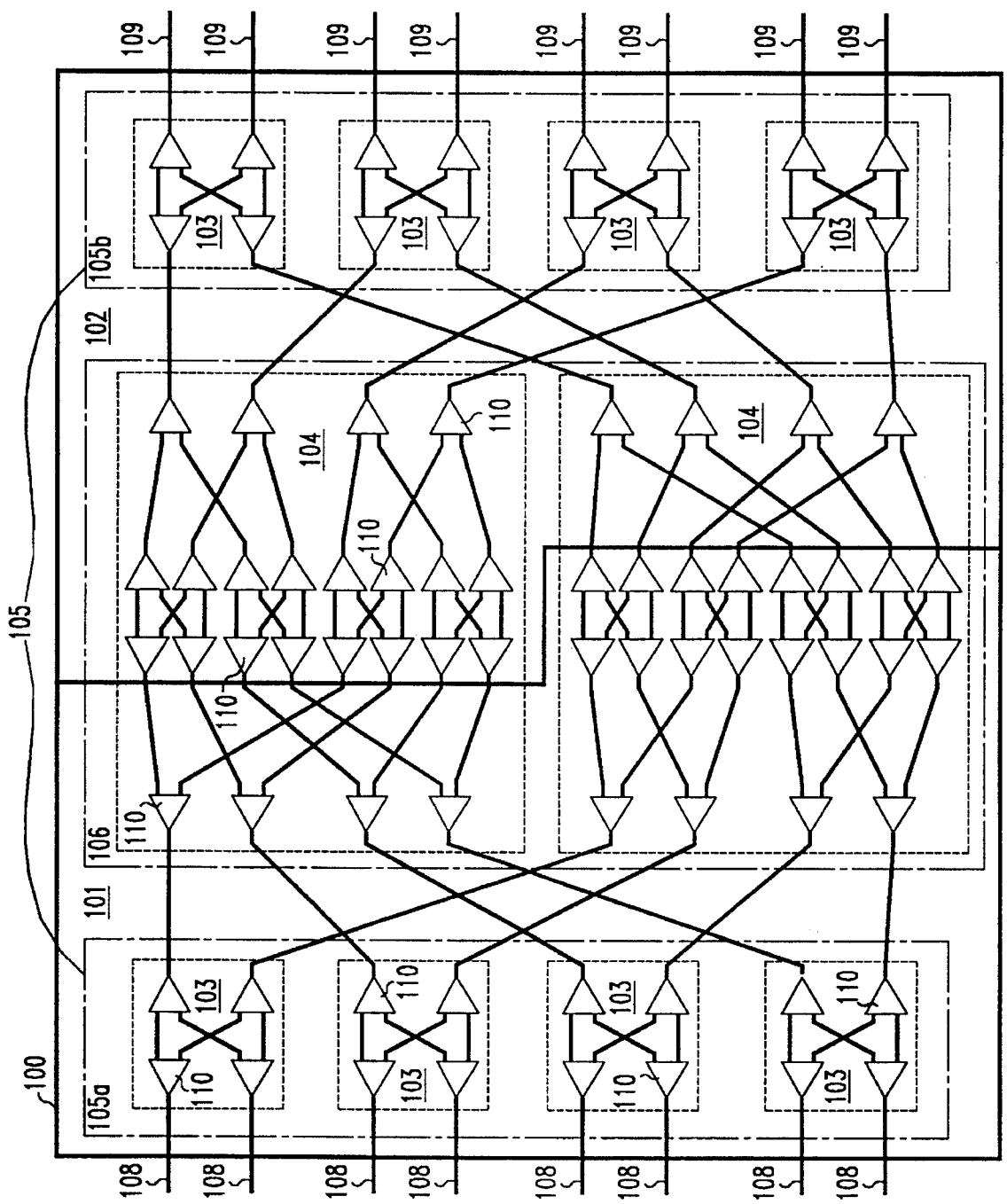
FIG. 1 is a block diagram of a switching-fabric array that includes an illustrative embodiment of the invention.

FIG. 1 shows a block diagram of a basic switching-fabric array 100 constructed according to the invention. Array 100 is an 8×8 (eight-input 108-by-eight-output 109) array. Array 100 is intended to be constructed as a single device, from which larger switching fabrics may be configured by interconnecting a plurality of arrays 100. Array 100 is constructed from a plurality of Y-branch or other 1×2 switching elements, each one of which is represented by a triangle and designated by the numeral 110 in FIG. 1. Eighty elements 110 make up array 100. Array 100 exhibits a hybrid network architecture: it has a Benes network outer layer 105, and an active-splitter/active-combiner network inner layer 106 comprising multiple active-splitter/active-combiner networks. The Benes network outer layer 105 is made up of two columns 105a and 105b of four standard 2×2 networks 103. The active-splitter/active-combiner network inner layer 106 is made up of one column 106 of two standard 4×4 active-splitter/active-combiner networks 104. The two columns 105a and 105b of the Benes network 105 surround, and interconnect with, the column 106 of the active-splitter/active-combiner networks, such that each 2×2 network 103 is separately connected to both of the 4×4 active-splitter/active-combiner networks 104, and correspondingly each of the 4×4 active-splitter/active-combiner networks 104 is separately connected to every 2×2 network 103.

Array 100 may be fabricated from a single substrate. However, for ease of manufacture, array 100 is fabricated from two topologically-identical substrates 101 and 102, each making up one-half of array 100, that are joined together back-to-back to form the complete array 100.

On one hand, Benes networks are the most efficient in terms of the number of switching elements needed. They are also rectangular networks that require the minimum number of elements in each column of the network. This is an advantage because by minimizing the number of elements in a column, a Benes network also tends to minimize the routing complexity between columns. But a standard Y-branch element implementation of an 8×8 Benes network switching fabric would require at least 10 columns of elements, and hence would result in a device that is too long to fabricate effectively.

On the other hand, an active-splitter/active-combiner network is the most efficient in terms of requiring the least number of columns in the network. However, this is done by requiring the network to widen in the middle stages, which leads to complex routing. A standard active-splitter/active-combiner implementation of an 8×8 switching fabric would require 6 columns of elements, but it would need arrays of 32 elements in the middle columns, and hence would result in routing complexity that makes optical-signal loss through the device too high.

In contrast to the standard architectures, the hybrid architecture of array 100 that is shown in FIG. 1 takes advantage of the two architectures. The outer Benes network layer 105 minimizes the routing complexity and the number of switching elements needed in the middle layer. Each inner 4×4 active-splitter/active-combiner network 104 is twice as wide in the middle stages as a 4×4 Benes network, but in this small size it has the same number of devices and about the same routing complexity as a Benes network, and less loss since it contains only four stages of elements 110 rather than six.

Another important feature of the architecture is the symmetry between the two halves 101 and 102 of the device. This allows both sides of the device to be manufactured as two identical switch halves that are joined together to form the full 8×8 switch. Since the layout for a 4×4 active-splitter/active-combiner network 104, that is optimized for the degree and number of bends and intersections for routing between elements, is asymmetrical, the two 4×4 active-splitter/active-combiner networks 104 are arranged in opposite directions, or as mirror images of one another: what are inputs of one network 104 are outputs of the other network 104, and what are outputs of the one network 104 are inputs of the other network 104. To further optimize the layout, each substrate 101 and 102 contains both center columns of elements 110 (i.e., unequal halves) of only one of the 4×4 active-splitter/active-combiner networks 104. When two identical halves 101 and 102 of array 100 are joined together, two complete 4×4 networks 104 are formed, one on the top and one on the bottom of array 100.

The resulting hybrid architecture has the following features:

Routing complexity similar to a Benes network.

Switch length similar to an 8×8 active-splitter/active-combiner network.

Less loss than either an 8×8 Benes or an 8×8 active-splitter/active-combiner network.

Rearrangeably non-blocking architecture.

Non-blocking multicast capability, if used as a 5×5 switch.

Blocking multicast capability, if used as an 8×8 switch.

Natural dilation. This means that only a single signal is switched through any Y-branch element 110 at any one time. Crosstalk has to travel through at least two elements 110 before it can couple to another signal. Since each element 110 provides a certain amount of crosstalk attenuation, the crosstalk is attenuated twice before it is allowed to couple. This leads to a network that has significantly better crosstalk characteristics that any single element 110.

Figure 2:
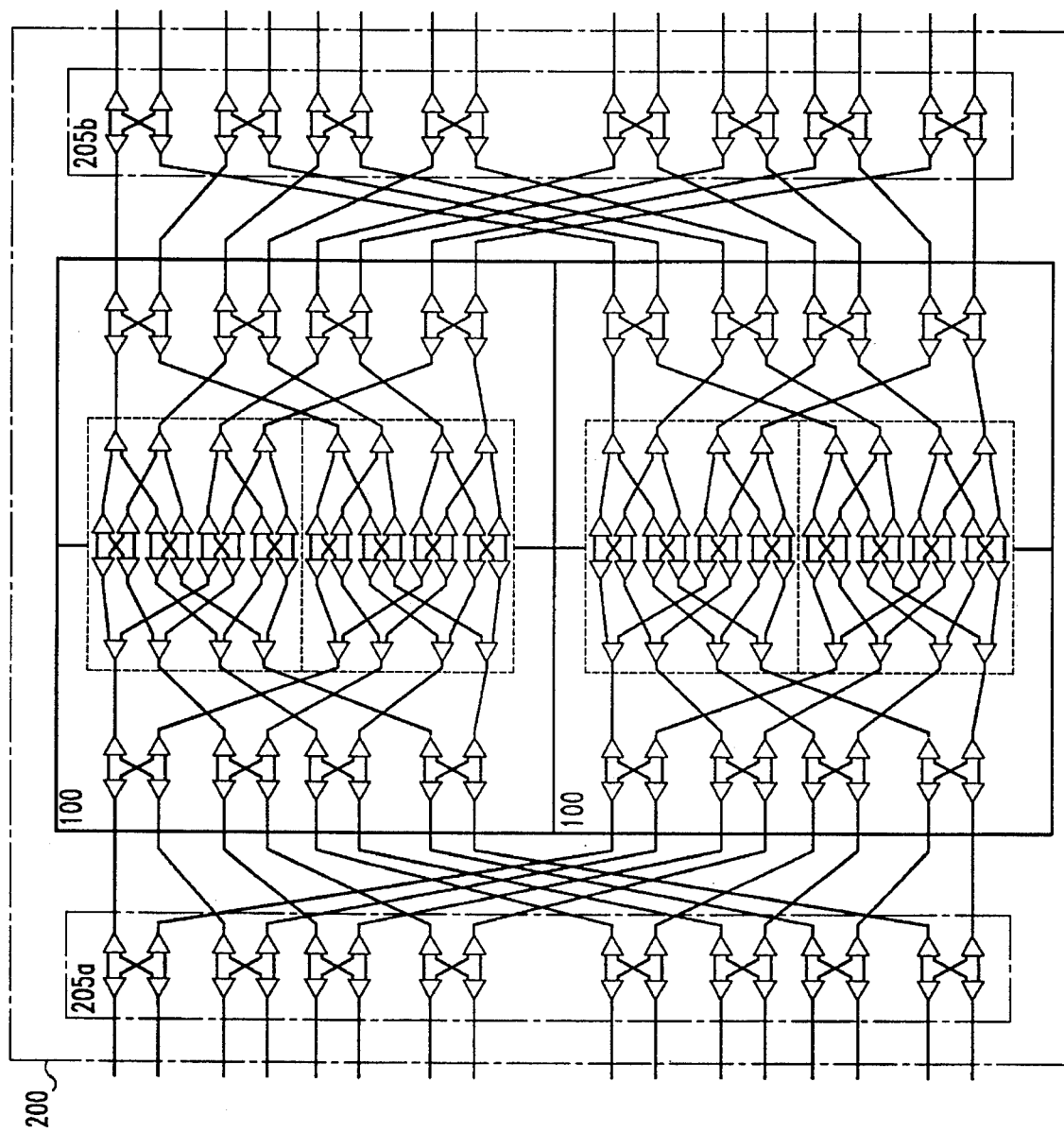
FIG. 2 is a block diagram of a switching-fabric array that includes an alternative embodiment of the invention.

Of course, various changes and modifications to the illustrative embodiment described above will be apparent to those skilled in the art. For example, the array 100 may be implemented via technology other than lithium niobate technology—via indium phosphide technology, for example. It may also be implemented with switching elements other than Y-branch switching elements. For example, any switching elements that act as 1×2 switching elements may be used, such as 2×2 switching elements (e.g., directional couplers) in which only three of the four ports are used. Also, 2×2 switching elements may be used naturally in this architecture. Furthermore, the array 100 may be constructed with dimensions other than 8×8. An illustrative example thereof is shown in FIG. 2, which shows a 16×16 hybrid network 200 constructed of an inner layer comprising two networks 100 of FIG. 1 surrounded by two columns 205a and 205b that form an outer Benes layer. The hybrid network 200 thus comprises two Benes layers surrounding a column of four active-splitter/active combiner networks. Such changes and modifications can be made without departing from the spirit and the scope of the invention and without diminishing its attendant advantages. It is therefore intended that such changes and modifications be covered by the following claims.

We claim:

1. A switching apparatus having signal inputs and signal outputs and comprising:

a Benes network divided into two halves, with one half connected to the signal inputs and another half connected to the signal outputs; and an active-splitter/active-combiner network interconnecting the two halves of the Benes network.

2. The switching apparatus of claim 1 wherein:

the Benes network and the active-splitter/active combiner network are implemented as an array of 1×2 switching elements.

3. The switching apparatus of claim 1 wherein:

the Benes network and the active-splitter/active-combiner network are implemented as an array of Y-branch switching elements.

4. The switching apparatus of claim 1 wherein:

said switching apparatus is fabricated on a single substrate.

5. The switching apparatus of claim 1 comprising:

a first substrate having implemented thereon the one half of the Benes network and one of two halves of the active-splitter/active-combiner network; and a second substrate having implemented thereon the other half of the Benes network and another of the two halves of the active-splitter/active-combiner network;

the first substrate and the halves of the Benes and the active-splitter/active-combiner networks implemented thereon being a duplicate of the second substrate and the halves of the Benes and the active-splitter/active-combiner networks implemented thereon, the two halves of the active-splitter/active-combiner network on the two substrates being interconnected with each other to form the active-splitter/active-combiner network and the switching apparatus.

6. An optical switching apparatus having optical-signal inputs and optical-signal outputs, comprising:

a plurality of Y-branch optical switching elements interconnected with each other to form a first plurality of networks connected to the optical-signal inputs, a second plurality of networks connected to the optical-signal outputs, the first and the second pluralities of networks together forming at least one Benes network, and at least one active-splitter/active-combiner network interconnecting the first plurality of networks with the second plurality of networks.

7. The optical switching apparatus of claim 6 wherein:

the optical switching apparatus is an 8×8 switching fabric;

the first plurality comprises four 2×2 networks;

the second plurality comprises four 2×2 networks;

the at least one Benes network comprises an 8×8 Benes network; and the at least one active-splitter/active-combiner network comprises two 4×4 active-splitter/active-combiner networks interconnecting the first and the second pluralities of the 2×2 networks such that every 2×2 network of the first and the second pluralities has a separate connection to each of the two 4×4 active-splitter/active-combiner networks.

8. The optical switching apparatus of claim 6 wherein:

said plurality of Y-branch optical switching elements is fabricated on a single optical substrate.

9. The optical switching apparatus of claim 6 wherein:

the at least one active-splitter/active-combiner network comprises two active-splitter/active-combiner networks that are a mirror image of each other;

the first and the second pluralities of networks are a mirror image of each other; and the optical switching apparatus further comprises two substrates, each having implemented thereon a different one of the first plurality and the second plurality of networks and a first portion of one of the active-splitter/active-combiner networks and a second portion of another of the active-splitter/active-combiner networks such that the first portion of a first of the active-splitter/active-combiner networks is a mirror image of the second portion of a second of the active-splitter/active-combiner networks and the second portion of the first of the active-splitter/active-combiner networks is a mirror image of the first portion of the second of the active-splitter/active-combiner networks, the two substrates being positioned back-to-back and having their respective portions of the first and the second of the active-splitter/active-combiner networks interconnected with each other to form the optical switching apparatus.

10. The optical switching apparatus of claim 9 wherein:

the first portion of either of the two active-splitter/active-combiner networks is either not identical to, or not a mirror image of, the second portion of said either of the two active-splitter/active-combiner networks.

11. The optical switching apparatus of claim 10 wherein:

the first portion of each of the two active-splitter/active-combiner networks comprises fewer Y-branch switching elements than the second portion of said each of the two active-splitter/active-combiner networks.

12. An optical switching apparatus having eight optical-signal inputs and eight optical-signal outputs, comprising:

a first and a second substrate each having a plurality of Y-branch optical switching elements implemented thereon and interconnected to form four 2×2 networks together forming a half of an 8×8 Benes network, a first portion of one 4×4 active-splitter/active-combiner network and a second portion, different from the first portion, of another 4×4 active-splitter/active-combiner network, the four networks being interconnected with the first and the second portions of the active-splitter/active-combiner networks such that every one of the four networks has a separate connection to each of the first and the second portions of the active-splitter/active-combiner networks;

the first and the second substrates, the Y-branch optical switching elements on each substrate, and the interconnections of the Y-branch optical switching elements on each substrate, all being duplicates of each other;

the four networks of the first substrate being connected to the optical-signal inputs and the four networks of the second substrate being connected to the optical-signal outputs, the two substrates being positioned back-to-back with respect to each other, the first portion of each of the 4×4 active-splitter/active-combiner networks being connected to the second portion of each of the 4×4 active-splitter/active-combiner portion, thereby interconnecting the first and the second substrates and forming the optical switching apparatus.

* * * * *